United States Patent Office 2,731,428
Patented Jan. 17, 1956

2,731,428
COPOLYMERS OF PHENOLIC RESIN ESTERS AND COMPOUNDS CONTAINING A VINYL-BENZENE NUCLEUS

Stuart A. Harrison, Minneapolis, Minn., assignor to General Mills, Inc., a corporation of Delaware No Drawing. Application September 13, 1954, Serial No. 455,793

11 Claims. (Cl. 260—19)

The present invention relates to copolymers of phenolic resin esters and compounds containing a vinyl benzene nucleus such as styrene, alpha-methyl styrene, vinyl toluene and the like.

The present application is a continuation-in-part of my co-pending application Serial No. 267,206 filed January 18, 1952 entitled Styrene-Phenolic Resin Ester Copolymer, now abandoned.

The phenolic resin esters employed in the present invention are higher unsaturated fatty acid esters of phenol-formaldehyde resins containing from about 4 to about 10 phenolic groups per resin molecule. These resin esters are drying oils which are useful in the protective coating field. They dry rapidly to yield hard films which have good alkali and water resistance. It has now been found, however, that some or all of the following properties, the drying rate, hardness and toughness, and the alkali and water resistance of films of these phenolic resin esters may be improved by copolymerizing the esters with vinyl-benzene compounds, the particular properties depending on the particular ester being modified. In addition, it is possible to increase the viscosity of the compositions by this copolymerization.

It is, therefore, an object of the present invention to provide a copolymer of vinyl-benzene compounds and phenolic resin esters of higher unsaturated fatty acids.

The phenol-formaldehyde resins employed in the present invention may be derived from phenol or from substituted phenols, particularly the aliphatic and aromatic hydrocarbon substituted phenols, in which the substituent contains from 1–8 carbon atoms such as p-tert-butylphenol and ortho- and para-phenylphenols. The resins contain from about 4 to about 10 phenolic groups per resin molecule, and are derived by acid catalyzed condensation. The resins are preferably substantially free from methylol groups, or at most contain only a few such groups so that there is no substantial increase in the molecular weight of the resin due to further condensation during subsequent esterification. The resins of this type may be formed from phenol itself by condensing from 2 to 3 mols of formaldehyde per 4 mols of phenol in the presence of an acid catalyst. In the preparation of resins from the substituted phenols the formaldehyde may be employed in equimolar quantities or in excess.

The resins may be formed under the usual acid catalyzed conditions. It is preferred, however, to prepare the substituted phenolic resins in an autoclave at temperatures of about 160° C. After the resin reaction is completed, any excess phenol and any bis- or tris-phenolic compounds may be removed by stripping them from the reaction mixture at temperatures of from 250–325° C. at a high vacuum, for example, at a pressure of from 2 to 10 mm. of mercury.

The resins described above may be esterified with higher unsaturated fatty acids of the drying or semi-drying type. These acids contain from 8 to 18 carbon atoms and may be the mixed acids of a drying or semi-drying oil, such as the mixed acids of soybean oil, linseed oil, tung oil, perilla oil, oiticica oil, and the like. They may likewise be selected fractions of the acids of such oils, or isolated fatty acids of such oils which have drying or semi-drying characteristics. In general, it is desired to employ acids having an iodine number of at least 100 and preferably at least 110.

The esterification may be carried out by simply heating the resins with the fatty acids, preferably in the presence of an esterification catalyst, at temperatures of from 200–275° C. The water liberated during the reaction may be taken off, condensed, and the reaction carried on until the product has a desired acid number. In general, it is preferred to esterify the phenolic resins to a degree such that from 70–100% of the hydroxyl groups are esterified with the higher fatty acids. The preferred products are those which are substantially completely esterified.

For copolymerization it is possible to employ any compound containing the vinyl-benzene nucleus. Typical readily available compounds include styrene, chlorinated styrene, alpha-methyl styrene and the vinyl toluenes including the ortho-, meta- and para-isomers and mixtures thereof. The amount of the vinyl-benzene compound employed in the product may range from 5 to 40% of the weight of the phenol resin esters. The improvement in properties obtained by the employment of the vinyl-benzene compound at a level below 5% is not pronounced while at concentrations in excess of 40% films formed from the product tend to become excessively hard and brittle. The preferred range of the vinyl-benzene compound is from 15 to 30%. The vinyl-benzene compound has a hardening effect upon the films produced from the copolymers. Accordingly, where the higher percentages of vinyl-benzene compound are employed, it is preferred to employ a resin ester having a higher degree of esterification. In other words, the higher fatty acid group in the resin ester acts as an internal plasticizer and where the resin ester contains a large number of such fatty acid groups the composition can tolerate a higher percentage of the vinyl-benzene compound. It will be apparent, therefore, that it is not possible to specify with exactness the quantity of vinyl-benzene compound to be employed in each composition. This depends upon the nature of the phenolic resin ester employed and upon the properties desired in the final copolymer. Those skilled in the art can readily determine the quantities and types of each to be employed for each particular application.

It will be appreciated that all of the vinyl-benzene compound employed may not react with the phenolic resin ester, and any unreacted material may be stripped from the product after reaction. Accordingly, the quantity of vinyl-benzene compound employed should be that which will result in the inclusion of from 5 to 40% of the weight of the ester either combined as a copolymer or as polymerized vinyl-benzene compound.

The copolymer is a liquid drying oil type of product which is soluble in the usual protective coating solvent such as mineral spirits, turpentine, benzene, toluene and the like. Films cast from solutions containing the copolymer and driers, dry rapidly to hard tough films which are resistant to water and alkali.

*Example 1*

A p-tert-butylphenol-formaldehyde resin was prepared by reacting substantially equimolecular amounts of p-tert-butylphenol and formaldehyde in an autoclave at around 160° C. in the presence of a small quantity of oxalic acid as catalyst. When the condensation had been carried on to the desired extent, for example, from 5 to 7 hours, any phenol and other volatile materials were stripped off by heating the reaction mixture to 310° C. at a low pressure, for example, 0.1 mm. of mercury.

The above resin was then esterified with soybean oil fatty acids, employing about 25% excess of fatty acids. The mixture of fatty acids and resin was heated in the presence of a small quantity of triphenyl phosphite as a catalyst to 260° C. for a period of about 3 hours. The reaction mixture was then stripped to 260° C. at approximately 0.1 mm. pressure to yield the ester having a low acid number.

100 grams of the above ester, 30 g. of styrene and 0.6 g. of cumene hydroperoxide (assay 69%) were placed in a 500 cc. round-bottom flask equipped with a condenser, mechanical stirrer and thermometer. The flask was heated by an electrical mantle heater. The air was swept out of the flask with nitrogen, and then the mixture was heated to 160° C. and held within the range of 160–170° C. for 4 hours. The temperature was then raised to 230° C. during the next hour, and held at this temperature for another 1.5 hours. At the end of this time about 10% of the original styrene remained unpolymerized and was removed by heating the reaction mixture to 230° C. at 0.2 mm. A solution was prepared containing 60% of the styrenated ester in mineral spirits and containing 0.1% cobalt as the naphthenate. Films were spread from this solution at a thickness of 0.003". This film set in 30 minutes, set dry in 110 minutes, and had a very slight tack in 8 hours. The dried film developed a slight haze in cold water in 96 hours, but recovered. The film swelled in boiling water, but recovered. In 5% aqueous alkali the film failed in 43 days. Sward rocker hardness of the film in 1 day was 14, in 7 days was 28. The Gardner viscosity of the 60% solution in mineral spirits was Z-4. In comparison the unstyrenated resin ester film failed in 5% aqueous alkali in 3 days.

The above copolymer tended to be slightly hazy. The clarity of these copolymers can be improved by using a mixture of alpha-methyl styrene and styrene.

*Example 2*

In this example the previously described resin ester was copolymerized with various mixtures of alpha-methyl styrene and styrene. The procedure followed was the same as that described in the preceding example. The results are given in the following table:

| No. | Parts Resin Ester | Parts Styrene | Parts alpha-Methyl Styrene | Clarity of Dried Film |
|---|---|---|---|---|
| 1 | 100 | 30 | 0 | sl. cloudy. |
| 2 | 100 | 25 | 5 | Do. |
| 3 | 100 | 20 | 10 | Do. |
| 4 | 100 | 15 | 15 | v. slightly cloudy. |
| 5 | 100 | 20 | 20 | cloudy. |
| 6 | 100 | 10 | 10 | clear. |
| 7 | 100 | 5 | 5 | Do. |

In general, products Nos. 3 and 4 appeared to have the best combination of properties.

*Example 3*

An ortho-phenylphenol-formaldehyde resin was prepared by reacting equimolar amounts of o-phenylphenol and formaldehyde in a stirred autoclave at 160° C. for seven hours. Oxalic acid 1.33% (based on o-phenylphenol) was used as the catalyst. This resin was stripped of low boiling excess reactants and by-products by heating to 275° C. at 20 mm. pressure.

The resin was esterified by the procedure in Example 1 with a 25% excess of soybean oil fatty acids at 260° C. Triphenyl phosphite catalyst and xylene azeotrope were used. After seven hours the resin was about 95% esterified. The resin ester was stripped of triphenyl phosphite and excess fatty acids by heating to 270° C. at 0.2 mm. pressure.

This ester (100 g.) was styrenated with 30 and 40 parts of styrene using 2% cumene hydroperoxide (69% assay) based on styrene, as the catalyst. The mixture was held at 160–170° C. for three hours, then heated up to 230° C. over a period of two hours and finally held at 230° C. for two additional hours before stripping off excess styrene. About 7.5–10% of styrene was recovered. The styrenated ester was dissolved in mineral spirits at a concentration of 60% solids. Drier 0.6% Pb and 0.075% Co was added. Films spread had the following drying rate and properties:

| | Gard. Visc., 60% Sol'n. in M. S. | Set | Set Thru | Tack Free | $H_2O$ | Hot $H_2O$ | Failure in 5% NaOH |
|---|---|---|---|---|---|---|---|
| 30% Styrene | W | 25 min | 1 hr | 8 hrs | O.K. | O.K. | 7 days. |
| 40% Styrene | Z | do | 45 min | 6 hrs | O.K. | sl. hazy | 10 days. |
| Unstyrenated esters | G | 2 hrs., 40 min | 4½ hrs | Overnight | O.K. | O.K. | 2 days. |

*Example 4*

A phenol-formaldehyde resin was made by heating 4 mols of phenol to 2⅜ mols of formaldehyde as formalin to 100° C. for 10 hours using oxalic acid catalyst. The resin was stripped of unreacted phenol, and low polymers by heating to 310° C. at 0.2 mm.

The resin was esterified with soybean oil fatty acids at 235° C., using a 25% excess of the fatty acids and triphenyl phosphite as the catalyst. At the end of 10 hours the resin was completely esterified. The excess fatty acids and catalyst were distilled off by heating to 275° C. at 1 mm.

The resin was styrenated with the following proportions of mixed styrene and alpha-methyl styrene.

| | Grams Resin Ester | Grams Styrene | Grams alpha-methyl-styrene |
|---|---|---|---|
| (1) | 100 | 20 | 10 |
| (2) | 100 | 15 | 15 |

The general procedure for styrenation was as follows: The resin ester (100 g.), styrenes (total 30 g.), and cumene hydroperoxide (0.6 g.) are heated and stirred in an inert atmosphere. The heating schedule is as follows: The mixture is heated to 160–170° C. for four hours, then raised to 230–240° C. for 3 to 6 hours. The excess styrenes are stripped off by heating to 240° C. at 0.5 mm.

The styrenation products were viscous solutions. The properties of solution and films (.003") made after addition of drier (0.3% Pb and 0.06% cobalt) are:

| No. | Viscosity 60% Sol'n. in M. S. | Clarity of film | Set | Set thru | Tackfree | Failure in 5% NaOH |
|---|---|---|---|---|---|---|
| 1 | V | Cloudy | 1 hr., 15 min | 3 hrs., 45 min | Overnight | 25 min. |
| 2 | Q | do | do | do | do | 15 min. |
| Orig. Ester | B | Clear | do | do | do | 3 min. |

All films were O.K. in hot and cold $H_2O$.

The alkali resistance of all of the above products was substantially improved by the copolymerization with styrene. Likewise the hardness of the films was definitely improved. In addition, the copolymerized compositions had a higher viscosity which made them more desirable for protective coating purposes. At the same time the water resistance was not impaired.

*Example 5*

A series of copolymers were made under similar conditions to those described in the previous examples. In this series vinyl toluene was copolymerized with a cresol resin ester and two different p-tert-butylphenol resin esters. In each instance the resin was esterified with soybean oil fatty acids. For purposes of comparison the following table shows the properties of the copolymer as well as the properties of the unmodified phenolic resin ester.

| Resin | Visc. Resin Ester | Percent Vinyl Toluene | Visc. After Copolymerization | Drying time (tack-free) minutes | Alkali Resistance, Hours to Failure |
|---|---|---|---|---|---|
| p-tert-butyl phenol (1) | A+ | 25 | V-K | 210 | O.K. 336 |
| Do | | 0 | | 315 | 360 |
| p-tert-butyl phenol (2) | A2 | 20 | C | 300 | 360 |
| Do | A1 | 0 | | 390 | 6 |
| o-cresol | A1 | 20 | D-E | 300 | 24 |
| Do | A2 | 0 | | 180 | 1½ |

As will be seen from the table in general the copolymer has an increased viscosity, a shorter drying time and improved alkali resistance. In each instance there is improvement in at least one of the properties and in general more than one of the properties. In these examples Dow vinyl toluene was employed which is understood to be a mixture of meta- and para-vinyl toluene.

Now, therefore, I claim:

1. A copolymer of a compound selected from the group consisting of styrene, the methyl substituted styrenes and the chlorine substituted styrenes and an unsaturated higher fatty acid ester of a phenol-formaldehyde resin, the fatty acid containing from 8 to 18 carbon atoms, the coploymer containing from about 5% to about 40% of said compound by weight, based on the weight of the phenolic resin ester.

2. A copolymer of styrene and an unsaturated higher fatty acid ester of a phenol-formaldehyde resin, the fatty acid containing from 8 to 18 carbon atoms, the copolymer containing from about 5% to about 40% of styrene by weight based on the weight of the phenolic resin ester.

3. A copolymer of alpha-methyl styrene and an unsaturated higher fatty acid ester of a phenol-formaldehyde resin, the fatty acid containing from 8 to 18 carbon atoms, the copolymer containing from about 5% to about 40% of alpha-methyl styrene by weight based on the weight of the phenolic resin ester.

4. A copolymer of vinyl toluene and an unsaturated higher fatty acid ester of a phenol-formaldehyde resin, the fatty acid containing from 8 to 18 carbon atoms, the copolymer containing from about 5% to about 40% of vinyl toluene by weight based on the weight of the phenolic resin ester.

5. A copolymer of vinyl toluene and an unsaturated higher fatty acid ester of a p-tert-butylphenol-formaldehyde resin, the fatty acid containing from 8 to 18 carbon atoms, the copolymer containing from about 5% to about 40% of vinyl toluene by weight based on the weight of the resin ester.

6. A copolymer of styrene and an unsaturated higher fatty acid ester of a p-tert-butylphenol-formaldehyde resin, the fatty acid containing from 8 to 18 carbon atoms, the copolymer containing from about 5% to about 40% of styrene by weight based on the weight of the resin ester.

7. A copolymer of styrene and an unsaturated higher fatty acid ester of an ortho-phenyl phenol-formaldehyde resin, the fatty acid containing from 8 to 18 carbon atoms, the copolymer containing from about 5% to about 40% of styrene by weight based on the weight of the resin ester.

8. A copolymer of styrene and an unsaturated higher fatty acid ester of a phenol-formaldehyde resin, the fatty acid containing from 8 to 18 carbon atoms, the copolymer containing from about 15% to about 40% of styrene by weight based on the weight of the phenolic resin ester.

9. A copolymer of vinyl toluene and an unsaturated higher fatty acid ester of a phenol-formaldehyde resin, the fatty acid containing from 8 to 18 carbon atoms, the copolymer containing from about 15% to about 40% of vinyl toluene by weight based on the weight of the phenolic resin ester.

10. A copolymer of styrene and an unsaturated higher fatty acid ester of a p-tert-butylphenol-formaldehyde resin, the fatty acid containing from 8 to 18 carbon atoms, the copolymer containing from about 15% to about 40% of styrene by weight based on the weight of the resin ester.

11. A copolymer of styrene and an unsaturated higher fatty acid ester of an ortho-phenyl phenol-formaldehyde resin, the fatty acid containing from 8 to 18 carbon atoms, the copolymer containing from about 15% to about 40% of styrene by weight based on the weight of the resin ester.

No references cited.